US006227515B1

(12) United States Patent
Broyles

(10) Patent No.: US 6,227,515 B1
(45) Date of Patent: May 8, 2001

(54) VARIABLE MASS PLATFORM

(76) Inventor: Michelle Broyles, 2786 Kings Hwy. E., Prescott Valley, AZ (US) 86314

( * ) Notice: Subject to any disclaimer, the term of this patent is extended or adjusted under 35 U.S.C. 154(b) by 0 days.

(21) Appl. No.: 09/428,090

(22) Filed: Oct. 27, 1999

(51) Int. Cl.$^7$ ................................................. F16M 11/22
(52) U.S. Cl. .................... 248/678; 248/638; 248/346.4; 248/396.02; 108/51.3; 108/165
(58) Field of Search ................................ 248/678, 638, 248/618, 346.02, 346.2, 346.4, 346.07, 346.11, 318; 108/51.3, 165

(56) References Cited

U.S. PATENT DOCUMENTS

| | | | |
|---|---|---|---|
| 2,957,668 | * 10/1960 | Norquist et al. | 248/120 |
| 3,201,109 | * 8/1965 | Sweeney et al. | 267/1 |
| 3,587,479 | * 6/1971 | Geschwender | 108/51 |
| 3,661,099 | * 5/1972 | Shelor | 108/51 |
| 4,116,344 | * 9/1978 | Ziemba | 214/10.4 |
| 4,645,171 | 2/1987 | Heide | 248/637 |
| 4,763,884 | * 8/1988 | Matsui et al. | 267/140.1 |
| 4,946,147 | * 8/1990 | Kato et al. | 267/140.1 |
| 5,100,096 | * 3/1992 | Mizuno et al. | 248/638 |
| 5,333,830 | * 8/1994 | Millen | 248/679 |
| 5,402,734 | 4/1995 | Galpin et al. | 108/28 |
| 5,558,920 | 9/1996 | Heide | 428/116 |
| 5,601,035 | * 2/1997 | Herring et al. | 108/51.3 |
| 5,626,157 | 5/1997 | Galpin et al. | 134/115 |
| 5,771,093 | 6/1998 | Tinti et al. | 356/244 |
| 6,073,902 | * 1/2000 | Hiles | 248/346.2 |

* cited by examiner

Primary Examiner—Anita M. King
Assistant Examiner—Steven Marsh
(74) Attorney, Agent, or Firm—The Halvorson Law Firm

(57) ABSTRACT

The present invention is a platform, or tabletop, that is useful for mounting and supporting items, such as scientific equipment and the like, wherein the overall mass of the platform may be varied as desired. The platform primarily consists of a rigid tabletop, and may include a supporting vibration isolation system. The platform, or tabletop, of this invention includes an upper surface, a lower surface, and an intervening side wall, that, together with the upper and lower surfaces, defines an interior cavity, or cavity enclosure. An intermediate surface partitions the interior cavity into two sections, a bottom section and a top section. The intermediate surface should seal the bottom section of the interior cavity thereby making the bottom section capable of containing fluids. This further ensures the platform is watertight and represents another material barrier to any vibrations between the upper surface and the main mass of the platform. The intermediate surface is located such that vertical support members are contained within the bottom section. An additional mounting surface, or tabletop may be attached to the upper surface wherein the mounting surface has a plurality of holes, or apertures, preferably drilled and tapped, that are used to securely mount items such as scientific equipment upon the tabletop.

16 Claims, 7 Drawing Sheets

VARIABLE MASS PLATFORM

FIELD OF THE INVENTION

The present invention relates to the field of stable platforms, such as optical and analytical devices, high-resolution production devices, metrology and microscopy applications on a substantially vibration free surface. More specifically, the present invention relates to a variable mass platform.

BACKGROUND OF THE INVENTION

Vibration isolation tables are used for supporting highly sensitive equipment, such as optical and analytical devices, on a substantially vibration free surface. Simple forms of these tables are well known and generally include a range of designs from thick granite to a tabletop comprising metallic upper and lower surfaces with connecting sidewalls. The upper surface of the tabletop typically contains a plurality of holes, usually drilled and tapped, that are used for securing equipment, such as optical equipment and the like, upon the upper or lower surfaces of the tabletop. For the most part, these tabletops are manufactured from extremely heavy materials and, when assembled, are heavy, bulky, and difficult to move or reposition. These tabletops are often supported by a vibration isolation system. An example of a vibration isolation system used with such a table would be the isolation system described in U.S. Pat. No. 4,360,184.

There have been some attempts to reduce the weight of these tables without a loss of structural strength. Previously a honeycomb core has been incorporated into these tables, with or without additional stiffening or damping components, which maintains a rigid separation between the top and bottom surfaces and therefore increasing the structural integrity of the tabletop while reducing the overall weight. These tabletops are commonly referred to as honeycomb tabletops. The honeycomb tabletop is an efficient structure for providing an array of tapped holes while also meeting the needs of flatness, and reasonable weight.

These tabletops need to be very heavy in order to reduce the vibratory effects of individuals brushing up against them, mechanical movement of instruments placed upon them, and/or external vibration sources. However, their heavy weight makes them difficult to move and/or reposition conveniently. Indeed, many optical tables, once positioned, are never again repositioned due to the great effort and expense required.

Thus, there is a need for a variable mass platform that is constructed in such a way that the overall mass of the table top may be varied as needed, from lightweight for movement and repositioning to heavyweight for vibration dampening and stability. Further, there is a need for a variable mass platform that also allows the user to "tune" the resonant null frequency of the platform to optimize the vibration signature with various pieces of equipment mounted on the table.

SUMMARY OF THE INVENTION

It is an object of the present invention to provide a platform, such as a tabletop, in which the overall mass of the platform may be varied.

It is another object of the present invention to provide a platform wherein the mass of the platform is varied by introducing or removing from the interior of the platform a filling fluid.

It is a further object of the present invention to provide a platform that includes an expandable table surface for increasing the effective work area of the platform surface.

It is yet another object of the present invention to provide a platform that includes a removable table surface that allows for any included holes to be easily cleaned when not actually attached to the platform.

It is yet a further object of the present invention to provide a platform with a table surface that includes drilled and tapped holes, each drilled and tapped hole having a tapered profile at the bottom of the hole to prevent any bolts or screws from inadvertently projecting below the bottom of the table surface.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF THE PREFERRED EMBODIMENTS

The present invention is a platform 10, or tabletop, that is useful for mounting and supporting items, such as scientific equipment and the like, wherein the overall mass of the platform 10 may be varied as desired. The platform 10 primarily consists of a rigid tabletop, and may include a supporting vibration isolation system 12.

Figure 1:
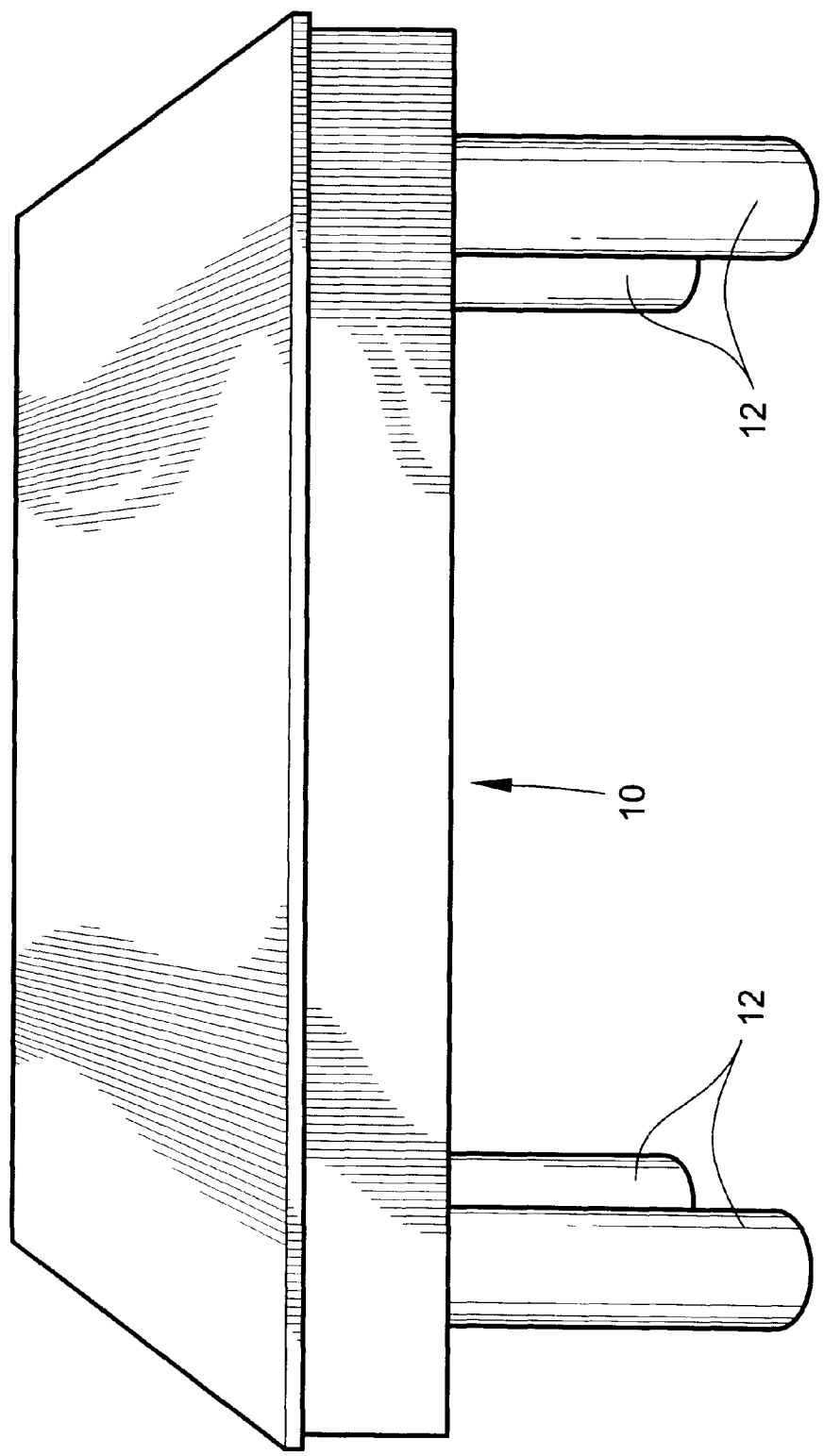
FIG. 1 illustrates a vibration isolation table according to the present invention that is used to support laboratory equipment.
Figure 2:
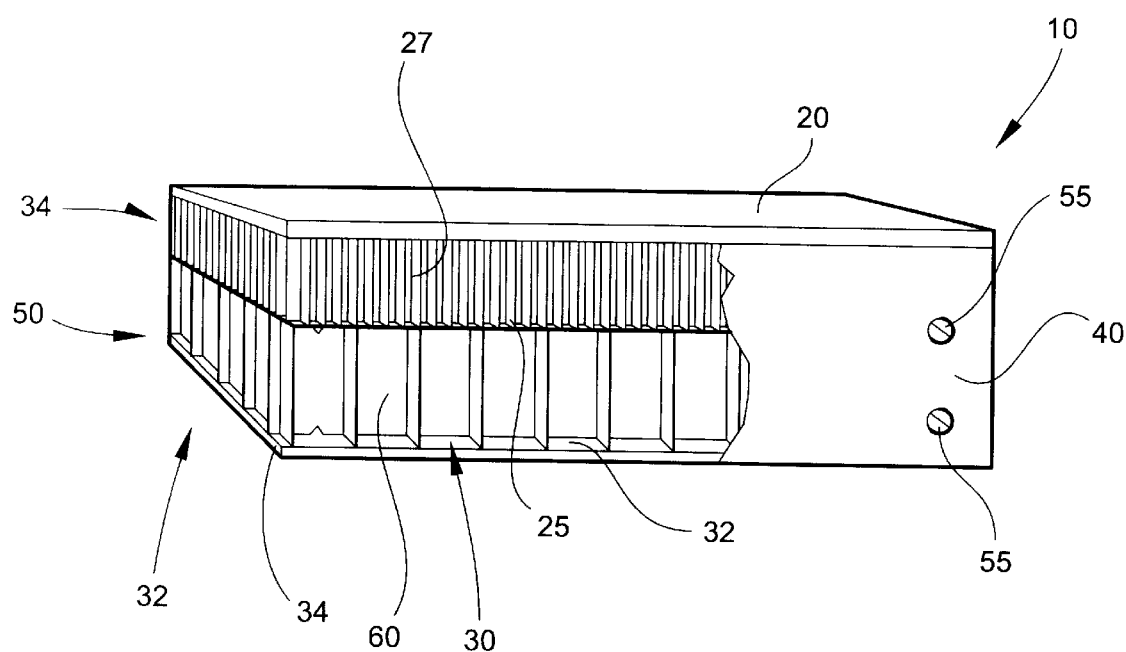
FIG. 2 is a perspective cut-away view of the platform, according to the present invention.
Figure 3:
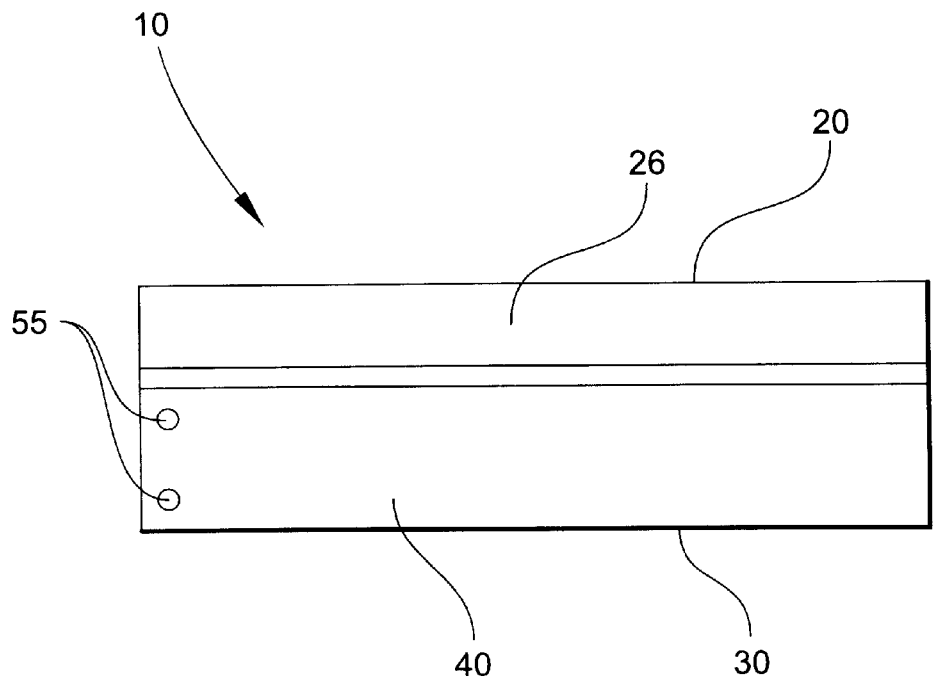
FIG. 3 is a side view of the platform according to the present invention.
Figure 4:
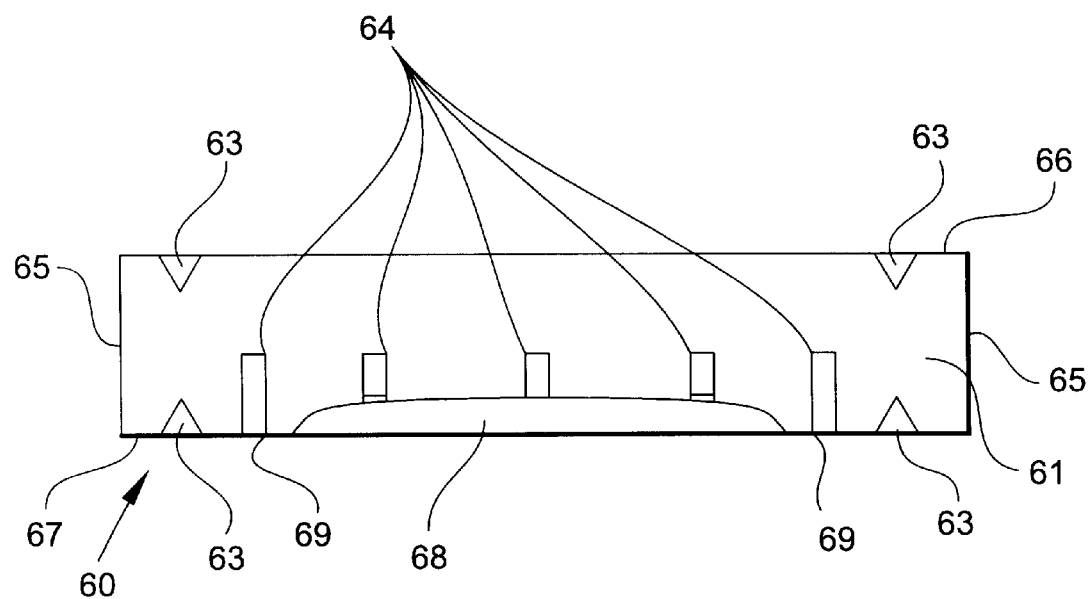
FIG. 4 is a view of the short vertical member according to the present invention.
Figure 5:
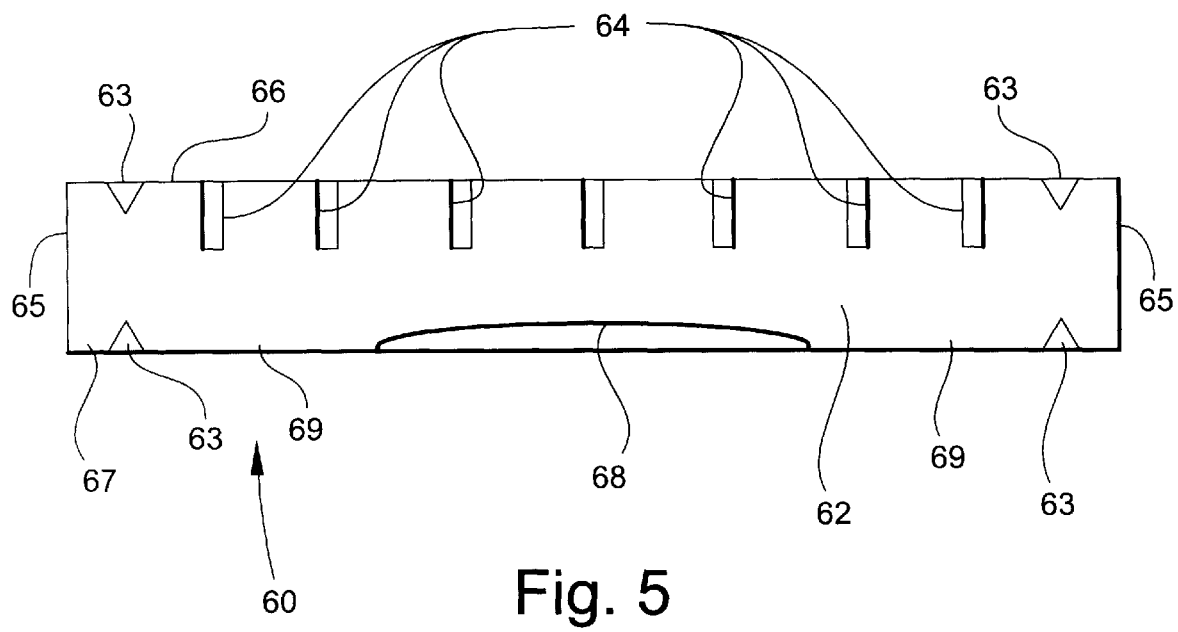
FIG. 5 is a view of the long vertical member according to the present invention.
Figure 6:
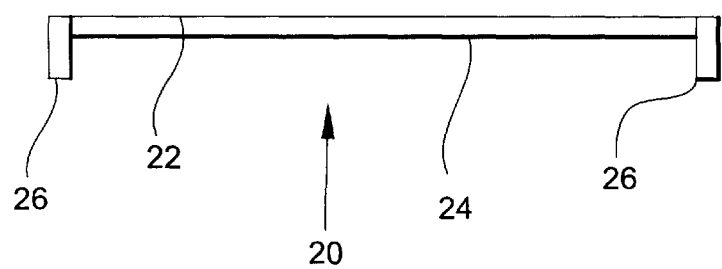
FIG. 6 is a cut-way side view of the upper section according to the present invention.
Figure 7:
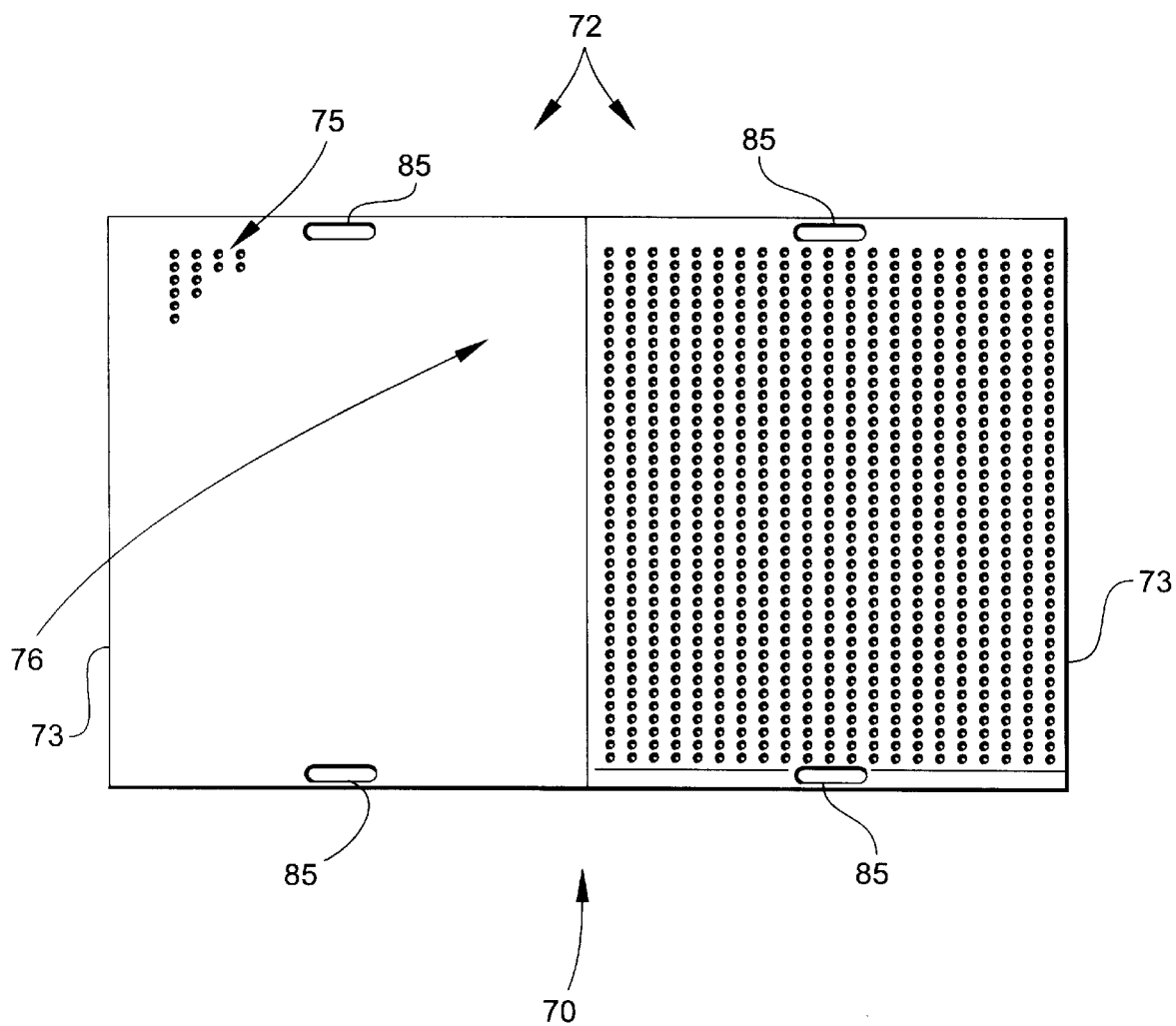
FIG. 7 is a view of the tabletop according to the present invention clearly illustrating the tapped apertures, one side is illustrated with only a portion of the mounting apertures.
Figure 8:
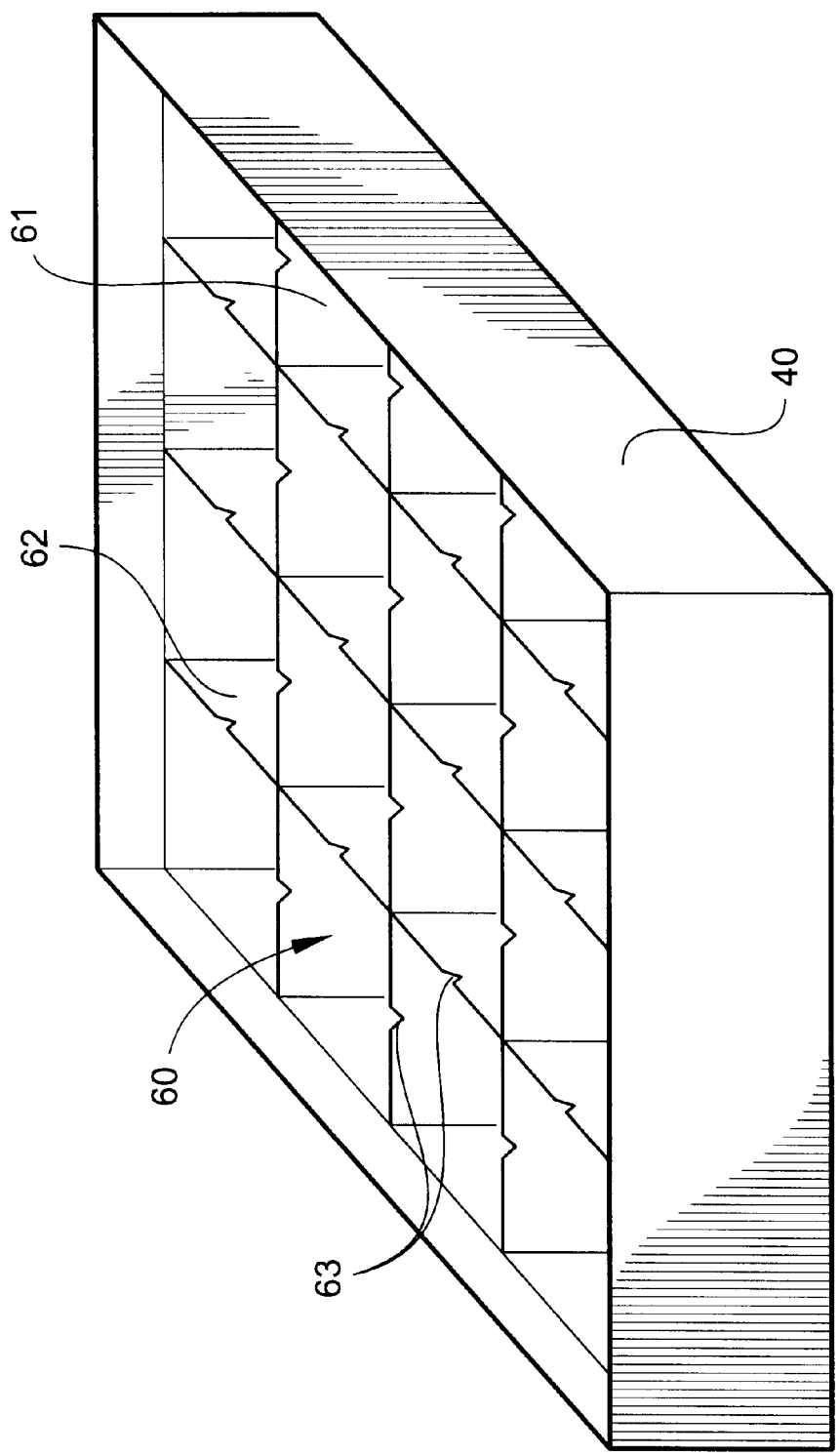
FIG. 8 is an illustration of the lattice structure in the bottom section of the cavity according to the present invention.
Figure 9A:
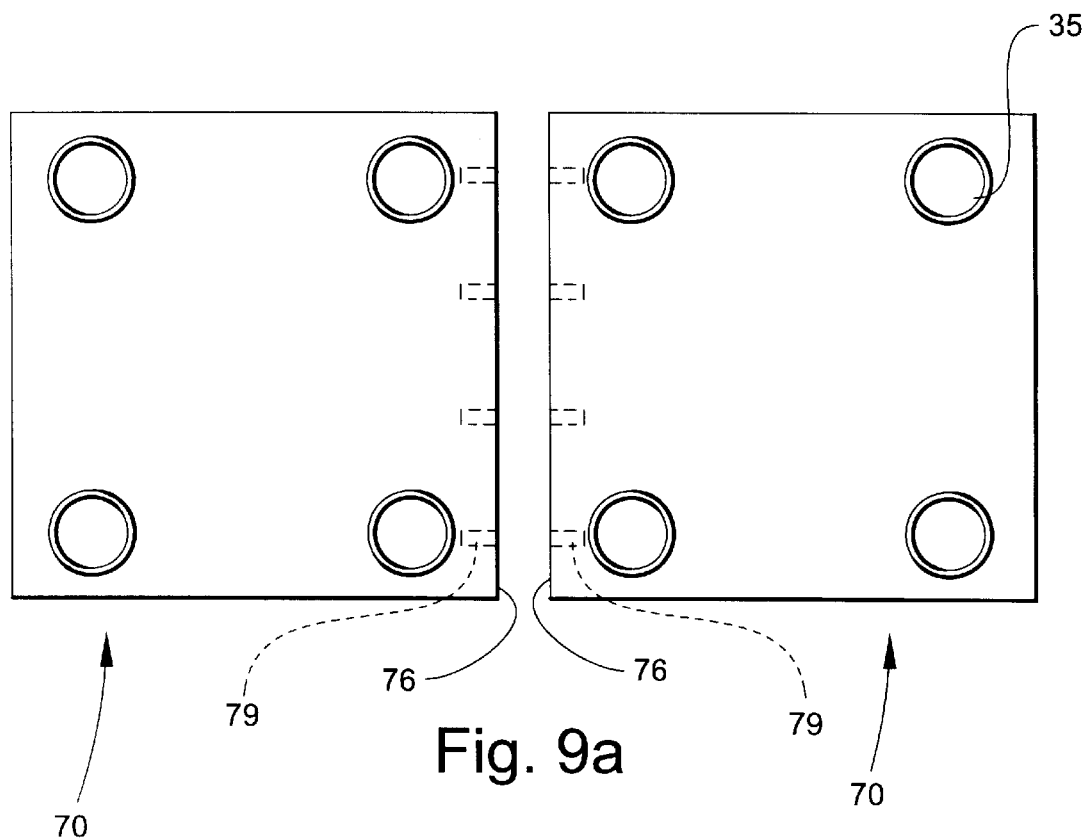
FIG. 9a is a top view of separate sections of the tabletop showing holes for the pinning mechanism according to the present invention.
Figure 9B:
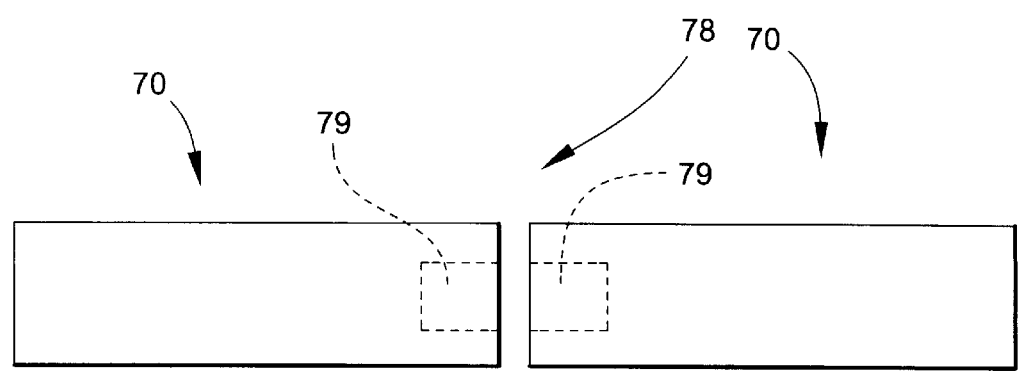
FIG. 9b is a side view of separate sections of the tabletop also showing the holes for the pinning mechanism according to the present invention.
Figure 9C:
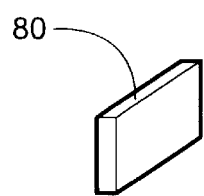
FIG. 9c is a perspective view of the flat pin according to the present invention.

Referring to FIG. 2, the platform 10, or tabletop, of this invention includes an upper surface 20, a lower surface 30, and an intervening side wall 40, that, together with the upper and lower surfaces, 20 and 30, defines an interior cavity 50, or cavity enclosure. An additional mounting surface, or tabletop, 70, as will be discussed below, may be attached to the upper surface wherein the mounting surface 70 has a plurality of holes, or apertures, preferably drilled and tapped, that are used to securely mount items such as scientific equipment upon the tabletop 70.

The lower surface 30 of the platform 10 includes a planar upper face 32 and a planar lower face 34. The lower face 34 is a generally exterior surface, while substantially the entire upper face 32 of the lower surface 30 is within the interior cavity 50 of the platform 10. The vertical members 60 are secured by a layer of adhesive to the upper face 34 of the lower surface 30. Those of skill in the art will recognize that other suitable glue systems could be used, such as cold curing epoxy resin systems, urethane-based glues or acrylic formulations. Additionally, the vertical members 60 may be integrally formed to the lower surface 30.

The process for assembling the platform 10 is as follows: the lower surface 30 is prepared and the side walls 40 are then secured to the lower surface 30 thereby partially defining the interior cavity 50. Preferably, the lower surface 30 and sidewalls 40 are formed as an integral unit, a single piece, to enhance the structural strength and reduce the possibility of fluid loss through joint defects. It is preferred that the lower surface 30 and sidewalls 40 are made from a reinforced fiberglass composite and is formed in a single molding operation.

Into the lower surface 30 are at least three molded leg mount pads 35, each placed in an optimal load bearing location, depending upon the number configuration. Each molded leg mount pad 35 is a generally circular indentation in the lower surface 30 for receiving a leg support, or a portion of the supporting vibration isolation system 12. In the preferred embodiment, there are three molded leg mount pads 35 at one end of the lower surface 30 and two molded leg mount pads 35 at the other end of the lower surface 30. This leg mount pad configuration allows both three and four-legged support, depending on the users particular requirements.

Preferably, an intermediate surface 25 partitions the interior cavity 50 into two sections, a bottom section 52 and a top section 54. The intermediate surface 25 should seal the bottom section 52 of the interior cavity 50 thereby making the bottom section 52 capable of containing fluids. This further ensures the platform 10 is watertight and represents another material barrier to any vibrations between the upper surface 20 and the main mass of the platform 10. The intermediate surface 25 is located such that the vertical members 60 are contained within the bottom section 52.

The vertical members 60 interlock to form a number of cells, or a structural grid, that is designed to both dampen vibration and to provide bridge truss type strength between the upper and lower surfaces 20 and 30 of the platform 10. The interlocking vertical members 60 are preferably bonded together at each joint and arranged in preferably an orthogonal pattern, but may be diamond or other geometrically shaped pattern. This interlocking structure is capable of being filled with fluid at a variety of different levels. This allows the user to "tune" the null resonant frequency of the platform 10 to vibrationally isolate any equipment mounted on the table and in doing so minimize the vibration signature of the whole assembly. In addition, the design of the platform 10 can accommodate a variety of different fluids, either individually or in combination, each different fluid having a different damping characteristic.

There are two different lengths of vertical members 60, a short vertical member 61 and a long vertical member 62. Preferably there are at least one, but more preferably five, long vertical members 62 and at least one, but more preferably seven, short vertical members 61. Each vertical member 60 is a relatively thin piece with two opposite ends 65, a relatively straight top end 66, and a bottom end 67. Additionally, the vertical members 60 may include a cut-out 68 that is preferably generally arcuately shaped. The arcuately shaped cut-out 68 creates two leg section 69 in the bottom end 67 of each vertical member 60. The leg sections 69 contacts the lower surface 30 and are used, in conjunction with the arcuately shaped cut-out 68, to spread any load placed upon the platform 10 to the peripheral of the lower surface 30. This, then, leaves the middle section free to only support the weight of any fluid that is injected into the interior cavity 50.

The short vertical members 61 have at least one, preferably five, assembly slits 64 incised into their top ends 66 and generally evenly spaced. The long vertical members 62 have at least one, preferably seven assembly slits 64 incised into their bottom ends 67 and generally evenly spaced. In an alternate embodiment, the short vertical members 61 may have at least one, preferably five, assembly slits 64 incised into their bottom ends 67 and generally evenly spaced and the long vertical members 62 have at least one, preferably seven assembly slits 64 incised into their top ends 66 and generally evenly spaced. Thus, the long and short vertical members 62 and 61 may be assembled to form a plurality of cells.

In assembling the short and long vertical members, 61 and 62, the slits 64 located on the top ends 66 are aligned with the slits 64 located on the bottom ends 67 and the long vertical members 62 (or short vertical members 61) are slid down onto the short vertical members 61 (or long vertical members 62).

Finally, there are a pair of notches 63, generally V-shaped, that may be formed at each of the two opposite ends 65. One notch of each pair 63 is located at the top end 66 and the other notch of each pair 63 is located at the bottom end 67. The purpose of the notches 63, or other configuration openings, is to allow ease in introducing and draining the fluids.

Additional internal damping material may be incorporated within the cells to aid in minimizing the vibrational effects of normal platform flexural modes and other induced vibrations.

The bottom section 52 of the interior cavity 50 is a system that is openable and closeable to fluid flow. This allows the bottom section 52 of the cavity enclosure 50 to be filled with a fluid thereby varying the mass of the entire platform 10 as desired. In order for fluids to flow into and out of the bottom section 52, there are at least one pair of input and exit nozzles, or ports, 55 extending through the sidewalls 40. One of the pair of nozzles 55 should be located near the lower end of the side walls 40 and the remaining nozzle should be located near the upper end of the side walls 40. It is preferred, but not critical, that the at least one pair of nozzles 55 be located near each other in the sidewalls 40. For convenience, the at least one pair of nozzles 55 are connected to appropriate tubing for the supply or discharge fluids, or directly to pumps for compression or suction. One nozzle may then be connected to a source of fluid, while the other nozzle is connected to a source of suction. It will be understood by those of skill in the art that where the bottom section 52 of the interior cavity 50 is only to be purged with inert gas, then a second vacuum source and adapter may be unnecessary. Likewise, those of skill in the art will recognize that there may be situations where the user does not want to force fluid into the bottom section 52 of the cavity interior 50. In such circumstances, it is likely that only suction would need to be applied.

Mounted onto the intermediate surface 25 is an air, or other fluid, filled section of dampening material 27, such as nidacore honeycomb. Preferably the dampening material 27 is a honeycomb structure, preferably with a cloth upper surface and a cloth lower surface that supplies substantial strength in both compression and bending and serves as a supporting or mounting surface for the upper surface 10. The dampening material 27 also provides yet another medium for any vibration to have to traverse and thereby be damped.

The upper surface 20 is preferably formed separately from the lower surface 30 and sidewalls 40. The upper surface 20 is mountable onto the dampening material 27 with any weight being supported by the upper surface 20 being transmitted from the upper surface 20 through the dampening material 27 to the intermediate section 25, from the intermediate section 27 through the vertical members 60 to the lower section 30, and from the lower section 30 through the legs, or supports, to the ground or floor.

The upper surface 20 should have an upper and a lower face, 22 and 24. Around the perimeter of the upper and lower face, 22 and 24, is a shoulder 26 that extends perpendicular to the lower face 24, downward. The shoulder 26 should be slightly larger in circumference than the sidewalls 40, thereby allowing the top surface 20 to be mounted over the sidewalls 40 in a box and lid like configuration. After assembly, the top surface 20 should be sealing attached, such as with a silicon adhesive or the like, to the side walls 40. The upper surface 12 may also come with at least one pre-bored and pre-tapped mounting aperture(s) 75. The mounting apertures 75 are used to mount equipment, such as lenses, shutters, lasers, and the like. Further, the mounting apertures 75 may include press fit threaded inserts for receiving hardware such as bolts or screws.

Generally the platforms 10 according to the present invention are rectangular in shape, but may be other shapes and still fall within the scope of the present invention. Further, depending on the anticipated use, the platform 10 can be supplied with an expanded fluid base, thereby increasing the platform mass as needed. Stainless steel edge molding may also be provided around the platform 10.

Further, the mounting surface, or tabletop, 70 may be attached to the upper surface 20. The tabletop 70, at least initially, may be a blank surface. However, the metal tabletop 70 may also come with at least one pre-bored and pre-tapped mounting aperture 75. The mounting apertures 75 are used to mount equipment, such as lenses, shutters, lasers, and the like. In the preferred embodiment the pre-tapped mounting apertures 75 have a narrowed lower end. This narrowing of the lower end of the apertures 75 serves to prevent bolts or screws from extending beyond the bottom surface of the table top and into the upper section 20 of the platform 10.

The tabletop 70 may be a single piece of material. Preferably, though, the tabletop is at least two, more preferably at least three, sections 72. In the more preferred embodiments, there are two outer sections 73 that slidably mount onto the upper surface 20 of the platform 10 and are capable of being movingly separated along the length of platform 10. If there are three or more sections 72, then the additional sections are designed to fit between the two outer sections 73 as expansion pieces. This is very similar to the expansion of a common kitchen or dining room table, but which has never been used or disclosed with heavy massed platforms such as is the subject matter of the present invention. Furthermore, since the tabletop 70 is sections 72, each section weighs less than a single large piece and may be more easily lifted and placed onto the upper surface 20. This allows the separate pieces 72 to be manufactured to an individual weight less than the maximum legislatively allowed for safe handling by an individual.

The separate pieces 72 slidingly fit together with their respective peripheral edges 76 matching each other. The separate pieces 72 may be releasably secured to each other, in order to prevent movement of the separate pieces 72 during use of the table top 70, by a pinning mechanism 78 that includes a pair of shaped apertures 79 on each side of each separate section 72. A generally flat pin 80 may then be placed such that half of each pin 80 fits within one hole 79 in each section 72. Further, the sections 72 may also have handle cut-outs 85 to provide an integrated gripping structure for the lifting and movement of the separate section 72 of the tabletop 70.

As will be recognized by those of skill in the art, the tabletop 70, the upper, lower surfaces, 20 and 30, and side walls 40 can be manufactured from ferromagnetic material, such as mild steel, or more normally from magnetic, martensitic stainless steel, thereby allowing the user to use magnetic clamps for attaching apparatus. Other materials such as ferrimagnetic, austenitic stainless steel or other suitable materials can be utilized. Although the upper and lower layers may be formed of dissimilar materials, in the preferred embodiment, the upper layer and lower layers 20 and 30 are of a graphite epoxy composite, and should have matching coefficients of linear expansion in order to eliminate thermal bowing or other adverse thermal instabilities. The vertical members 60 may be manufactured from metal, such as steel, aluminum alloy, or stainless steel, but are preferably also made from a fiberglass or graphite and epoxy composites.

Those of ordinary skill in the art will also recognize that the platform 10 may also include laser ports or other cutouts that extend through the entire platform 10. Advantageously, the opening to the port in the upper surface 20 may be covered when not in use.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A platform for mounting items comprising:
   a) a lower surface;
   b) an upper surface;
   c) an intervening side wall that extends between the lower surface and the upper surface thereby defining a cavity;
   d) an intermediate surface that partitions the cavity into a bottom section and a top section, said bottom section being sealed sufficiently to be fluid containing and openable and closeable to fluid flow; and
   e) at least two vertical members contained within the bottom section of the cavity, said vertical members interlocking to form a grid.

2. The platform according to claim 1 further including a tabletop that is attached to the upper surface.

3. The platform according to claim 1 further including at least three molded leg mount pads on the lower surface.

4. The platform according to claim 3 further including a supporting vibration isolation system that attaches to the at least three molded leg mount pads.

5. The platform according to claim 1 wherein the at least two vertical members is at least one short vertical member and at least one long vertical member, each vertical member having assembly slits position to allow the vertical members to interlock.

6. The platform according to claim 5 wherein the at least one short vertical member is seven short vertical member, each having five assembly slits, and the at least one long vertical member is five vertical members, each having seven assembly slits.

7. The platform according to claim 1 wherein each of the at least two vertical members has a relatively straight top end and a bottom end, further a cut-out located in the bottom end creates two leg sections in the bottom end of each vertical member, and each vertical member has a pair of draining notches.

8. The platform according to claim 1 wherein the bottom section of the cavity is openable and closeable to fluid flow through at least one pair of nozzles that extend through the side wall of the platform.

9. The platform according to claim 1 further including a dampening material mounted onto the intermediate surface, in the top section of the cavity.

10. The platform according to claim 9 wherein the dampening material is a cloth covered honeycomb structure.

11. The platform according to claim 1 wherein the upper section further has a perpendicular shoulder that is sufficiently larger in circumference than the sidewalls to allow the shoulder to fit over the sidewalls.

12. The platform according to claim 11 wherein the upper surface further includes at least one mounting aperture.

13. The platform according to claim 2 wherein the table top further includes at least one mounting aperture.

14. The platform according to claim 2 wherein the table top is assembled from more than one separate section.

15. The platform according to claim 14 wherein the separate sections of the table top are slidingly attached to the platform to allow for surface expandability of the table top.

16. The platform according to claim 14 wherein the separate sections are coupled together by at least one pin that fits into apertures that are located in the separate sections and shaped to receive the at least one pin.

* * * * *